INVENTOR.
CLARENCE HOWARD MELLOR
BY JAMES J. FOLEY

Anderson + Baronick
Attorneys

United States Patent Office 3,362,064
Patented Jan. 9, 1968

3,362,064
MEASURING DEVICE
Clarence Howard Mellor, Framingham, and James J. Foley, Hopkinton, Mass., assignors to Space Sciences, Incorporated, Waltham, Mass., a corporation of Massachusetts
Filed May 8, 1964, Ser. No. 366,092
7 Claims. (Cl. 29—573)

ABSTRACT OF THE DISCLOSURE

A method is provided for preparing a coaxial thermocouple comprising heating a first end of a center rod of a first thermocouple material to its melting point preferably while rotating the center rod about its longitudinal axis while it is being heated to form an enlarged mass at the first end. The center rod is positioned in a tube preferably comprising a second thermocouple material so that the inside diameter of the mass is close to one end of the tube. Preferably the tube and the center rod are rotated about their longitudinal axes and the mass heated to its melting point to seal the end of the tube.

---

Figure 1A:
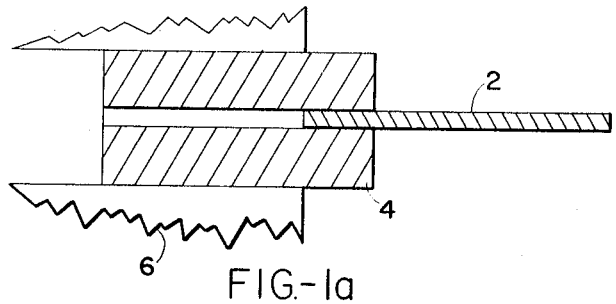
Figure 1B:

Generally coaxial thermocouples comprise a center post or rod composed of one of the thermocouple materials which is coaxially set in and attached to the closed end of a tube composed of the second thermocouple material. Usually in the production of such thermocouples considerable thermal and mechanical working has to be employed to close the end of the tube and form the junction. Such working usually involves elaborate jigging and requires considerable skill. Further, the mechanical and thermal working often produces crystalline changes in the outer and more vulnerable tube section which may lead to intercrystalline failures and cracks. The problem of undesirable crystalline changes occurring during working is particularly present when the tube section comprises a material such as tungsten or a tungsten alloy. The present invention is concerned with the preparation of such coaxial thermocouples by a method which is simple and free of the difficulties mentioned above.

One object of the present invention is to provide a method for preparing coaxial thermocouples which require little mechanical working and skill.

Another object of the invention is to provide a method for preparing coaxial thermocouples which substantially reduces the possibility of producing crystalline changes in the outer tube portion of the thermocouple.

Still another object of the invention is to provide coaxial thermocouples and particularly coaxial thermocouples comprised of tungsten and/or tungsten alloys by the above method.

Other objects of the invention will in part be obvious and will in part appear hereinafter.

The invention accordingly comprises the method involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein FIG. 1a to d, are cross-sectional views illustrating the preparation of a coaxial thermocouple by the method of the present invention.

Generally, in carrying out the method of the present invention, the center post or rod is rotated about its longitudinal axis, e.g. in a lathe. As the rod is rotated, one end is heated to its melting point using a suitable heating means such, for example, as a heliarc welding torch. Preferably, the heating means is axially aligned with the center line of the rod. As a result of the heat and centrifugal force an enlarged mass, e.g. a ball-like mass is formed on the end of the rod. The heating and rotation of the rod is continued until the diameter of the mass or head at the end of the rod is almost equal to the inside diameter of the tube which is to be employed as the second component of the thermocouple. At this stage the mass is cooled and the rod is coaxially positioned within the tube so that the mass is closely adjacent one end of the tube. The tube and rod are rotated and heat is applied to fuse the end of the tube to the mass.

In a preferred mode of forming the enlarged mass at the end of the rod, the heating means is moved towards the rod as it is rotated causing the molten mass to recede and melt more of the rod. When the desired amount of material has been melted the heat is reduced so that only the front surface of the mass nearest the heating means remains molten. In this state, the rotation of the rod causes the molten material to slide away from the center portion of the mass and freeze at the outer edge thereof, thus causing the diameter of the mass to increase.

The junction between the mass and tubing is preferably formed by positioning the mass just inside the tubing, e.g. recessed about 0.015 inch from the edge, and applying heat to the mass as it and the tube are rotated. The heat and rotation cause some of the mass to melt and flow towards the wall of the tubing. Usually during the fusion the overhang of the tubing will also melt due to conduction of heat from the mass. Generally, the joining of the mass and tubing will be completed when the overhang of the tube collapses.

The method of the present invention is particularly useful in forming coaxial thermocouples of refractory metals and alloys thereof. It is especially useful in preparing coaxial thermocouples of tungsten and/or tungsten-rhenium alloys such, for example, as:

| Center rod | Tubing |
|---|---|
| Tungsten-5% rhenium | Tungsten-26% rhenium |
| Tungsten-26% rhenium | Tungsten-5% rhenium |
| Tungsten | Tungsten-26% rhenium |
| Tungsten-26% rhenium | Tungsten |

Figure 1C:
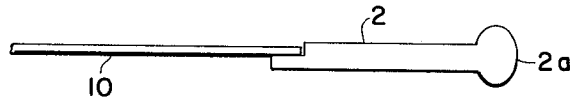
Figure 1D:
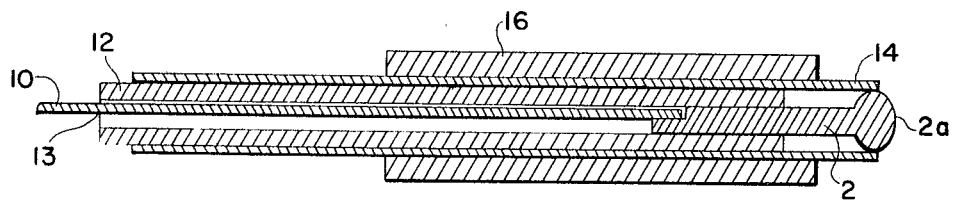

Referring to FIGURE 1a through d, there is shown an illustration of the method of the present invention. In FIGURE 1a, a center rod 2 is set in a chill 4 which in turn is set in a collet 6 of a suitable lathe (not shown). The lathe is rotated and the end of the rod is brought to its melting point by a suitable heating means, e.g. a heliarc torch (not shown). The heating and rotation are continued until an enlarged mass 2a (FIG. 1b) of substantially the desired diameter is formed. The mass 2a is then cooled (preferably in an inert atmosphere) and an extension wire 10 is welded to the center rod (FIG. 1c). The center rod 2 withe the wire extension 10 is placed in a second chill 12 (FIG. 1d) which has a channel 13 therein for receiving the wire extension 10. The channel 13 serves in preventing the wire 10 from being snapped off during the subsequent steps of the method. The second chill is slid inside the tube 14 of the second thermocouple material so that the mass 2a lies just inside the edge of the tube 14. The tube 14 is then set in another chill 16 held in the collet 6 (not shown in FIG. 1d) of the lathe. The lathe is rotated and heat is applied to the center of the mass 2a until the seal between the mass 2a and the tube 14 is complete.

The following non-limiting example illustrates the method of the present invention.

*Example*

A tungsten-5% rhenium center post 2, about 1⅛ inches long and about 0.062 inch in diameter was placed in a copper chill 4 such as shown in FIG. 1a. The chill was held in collet 6 which was attached to a lathe in a conventional manner. The lathe mechanism was rotated thus also rotating the rod workpiece. In this instance, the lathe was rotated at about 14 r.p.m.

A heliarc torch was positioned in the carriage of the lathe such that the electrode thereof was axially aligned with the center line of the rotating rod. An arc was then struck to the rod and the power increased to the desired level. Due to the heat and rotation, the tip of the rod was melted and rolled back to form a ball-like mass 2a. The torch was advanced toward the rod causing the molten ball-like mass to recede and melt more of the rod. During the recession and growth of the molten mass 2a, the torch was moved or advanced so that the electrode was maintained at the distance of from about 1/16 to about 1/32 of an inch from the end of the balled mass. When the required amount of the rod had been melted, in this case until about only ½ inch of the rod remained unmelted, the power was cut back so that only the surface of the ball-like mass closest to the electrode was maintained in a molten state. Due to the continued rotation of the rod, the molten portion of the mass was moved to the outer edge thereof where it solidified thus enlarging the mass. The rotation and heating were continued until the mass had an outside diameter of about 0.143 inch. The mass was then cooled in an inert argon atmosphere.

An extension wire 10 was welded to the distal end of the rod 2 and this assembly was then mounted in a suitable copper chill 12. The chill was slipped into a tungsten–26% rhenium tube 14 so that the portion of the mass with the maximum outer diameter was positioned or recessed about 0.015 inch inside the end of the tube. This entire assembly was mounted in another copper chill 16 which was held in a collet attached to a lathe.

The lathe was rotated at about 14 r.p.m. and a suitable arc was struck between the mass 2a and the electrode of the heliarc torch which was axially aligned with the center line of the mass. The electrode was held about 1/32 of an inch away from the end of the mass. The heat and rotation caused the surface of the mass closest to the electrode to melt and to be moved into contact with the wall of the tubing 14. The slight overhang of the tubing was also melted and collapsed due to the conduction of heat from the mass. Upon the completion of the weld or seal between the tube 14 and mass 2a the resulting thermocouple was allowed to cool in an inert argon atmosphere.

When desired, the thermocouples of the present invention may be coated, subsequent to their formation, with protective coatings such, for example, as zirconium diboride, hafnium oxide, aluminum oxide, boron nitride, beryllium oxide, and the like.

In forming the junction between the mass and the tube, it is preferable, in order not to form an unnecessarily large junction, to limit the time of heating. In the above example, the seal was completed in about 5 seconds when the workpiece was being rotated at about 14 r.p.m.

The speed of rotation of the rod in forming the ball-like mass and in the joining of the mass to the tube can be varied over wide limits. Generally, speeds of about 10 to about 30 r.p.m. will be useful.

The teachings of the present invention can also be utilized for the preparation of thermocouples commonly designated as thermocouple with a protective tube or thermocouple with well. In this type of thermocouple assembly a tube or sheath preferably having one end thereof closed is provided to enclose and protect a two-wire thermocouple.

The two-wire thermocouple can be formed by first twisting together a short portion of one end of each of the wires. The twisted wires or the twisted wire portion can be heated with, for example, a heliarc torch, so as to cause the twisted portion to melt and to roll up to form into a ball-like mass thus firmly joining together one end of each of the two wires and forming an excellent thermocouple junction. The thermocouple wires can then be inserted in or enclosed by a protective sheath or tube; the joined portion of the wires forming the thermocouple junction being positioned in the tube or sheath so as to be substantially adjacent or in contact with the closed end thereof.

The thermocouple wires and protective tubing can be formed of materials well known in the art. For instance, the thermocouple wires can be selected from the group consisting of the refractory metals and alloys, e.g. tungsten and tungsten–rhenium alloys as heretofore noted, while the protective tubing can be ceramic, a refractory metal or alloy, a refractory metal oxide, carbide, nitride or the like.

Since certain changes may be made in the above product and method without departing from the scope of the invention herein involved, it is intended that all matter contained in the above description and in the accompanying drawing shall be interpreted as illustrative and not in a limiting sense.

What is claimed is:

1. A method for preparing a coaxial thermocouple which comprises heating a first end of a center rod comprising a first thermocouple material to its melting point, rotating said center rod about its longitudinal axis while said center rod is being heated to form an enlarged mass at said first end, coaxially positioning said center rod in a tube comprising the second thermocouple material so that the outside diameter of said mass is close to one end of said tube, rotating said tube and said center rod, while in coaxial position, around their longitudinal axis and heating said mass to its melting point, whereby said mass is sealed to said tube.

2. A method as defined in claim 1 wherein said mass is heated and rotated until its outside diameter is substantially equal to the inside diameter of said tube.

3. A method as defined in claim 1 wherein said first and second thermocouple materials are selected from the group consisting of tungsten and tungsten–rhenium alloys.

4. A method for preparing a coaxial thermocouple which comprises forming an enlarged mass at the end of a rod comprising a first thermocouple material, said mass having an outside diameter substantially equal to the inside diameter of a tube comprising a second thermocouple material, coaxially positioning said rod in said tube so that said outside diameter of said mass is close to one end of said tube, and joining said mass and said tube together to close said tube by heating said mass to its melting point.

5. A method as defined in claim 4 wherein said first and said second thermocouple materials are selected from the group consisting of tungsten and tungsten–rhenium alloys.

6. A method of preparing a coaxial thermocouple which comprises coaxially positioning a rod comprising a first thermocouple material and having an enlarged mass at one end thereof in a tube comprising a second thermocouple material, the outside diameter of said mass being substantially equal to the inside diameter of said tube, said rod being positioned in said tube so that said mass is close to one end of said tube, and joining said mass and said tube together by heating said mass to its melting point.

7. A method as defined in claim 6 wherein said first and said second thermocouple materials are selected from the group consisting of tungsten and tungsten-rhenium alloys.

References Cited

UNITED STATES PATENTS

| | | | |
|---|---|---|---|
| 1,229,770 | 6/1917 | Marsh | 136—228 X |
| 1,584,882 | 5/1926 | Marsh | 136—228 |
| 2,957,037 | 10/1960 | Sims | 136—236 |
| 3,006,067 | 10/1961 | Anderson | 29—470 |
| 3,065,286 | 11/1962 | Connell. | |
| 3,249,988 | 5/1966 | Sapoff | 29—155.5 X |

OTHER REFERENCES

"Electro-Technology," vol. 68, July 1961, page 11.

WILLIAM I. BROOKS, *Primary Examiner.*